(12) United States Patent
Bucci et al.

(10) Patent No.: US 7,546,945 B1
(45) Date of Patent: Jun. 16, 2009

(54) SYSTEM AND METHOD FOR MANAGING TRANSACTIONS

(75) Inventors: Michael Vincent Bucci, Glen Allen, VA (US); David A. LaGassa, Richmond, VA (US); Michele D. Matthews, Richmond, VA (US); Donald J. Gilbert, Midlothian, VA (US)

(73) Assignee: Capital One Financial Corporation, McLean, VA (US)

( * ) Notice: Subject to any disclaimer, the term of this patent is extended or adjusted under 35 U.S.C. 154(b) by 201 days.

(21) Appl. No.: 11/298,103

(22) Filed: Dec. 9, 2005

(51) Int. Cl.
*G06Q 40/00* (2006.01)
(52) U.S. Cl. .......................... 235/379; 705/35; 705/38; 705/39; 705/44
(58) Field of Classification Search ................. 235/379; 705/35, 38, 39, 44
See application file for complete search history.

(56) References Cited

U.S. PATENT DOCUMENTS

| 6,128,603 | A | 10/2000 | Dent et al. | |
| 2002/0116331 | A1* | 8/2002 | Cataline et al. | 705/39 |
| 2002/0174048 | A1* | 11/2002 | Dheer et al. | 705/36 |
| 2004/0117302 | A1 | 6/2004 | Weichert et al. | |
| 2004/0193537 | A1* | 9/2004 | Knapp | 705/39 |
| 2005/0097040 | A1* | 5/2005 | Chen et al. | 705/40 |
| 2005/0149436 | A1* | 7/2005 | Elterich | 705/39 |
| 2005/0177502 | A1 | 8/2005 | Thomas | |
| 2006/0277139 | A1* | 12/2006 | Poltorak | 705/38 |

* cited by examiner

*Primary Examiner*—Michael G Lee
*Assistant Examiner*—Kristy A Haupt
(74) *Attorney, Agent, or Firm*—Baker & McKenzie LLP (57) ABSTRACT

Systems and methods for managing transactions associated with accounts of an individual are described. A method for managing transactions includes receiving information associated with the individual, information associated with a first account of the individual, and information associated with a second account of the individual. The received information associated with the individual and with the first and second accounts is processed, and a transaction based upon a result of the processing is automatically performed.

17 Claims, 2 Drawing Sheets

SYSTEM AND METHOD FOR MANAGING TRANSACTIONS

FIELD

The present application relates to systems and methods for managing transactions, and more particularly to systems and methods for managing transactions based upon account information obtained from financial entities.

BACKGROUND

Accounts, such as financial accounts, may be held by individuals and may be used to maintain balances of cash and/or credit and to fund transactions such as purchase transactions involving goods and services. A plurality of terms may be associated with an account, and the plurality of terms may include, for instance, terms related to balance limits of the accounts, credit limits of the accounts, access to the accounts, and conditions of usage of the accounts. The terms may also relate to transaction type, transaction location, transaction frequency, transaction quantity, and the like, in association with usage of the account.

Advancement and competition within the financial industry has resulted in the development of a variety of accounts and account types having a large number of account terms and combinations of terms. For example, various types of accounts having different terms related to account usage have been introduced, and individuals have also been provided with a variety of accounts having terms that suit a wide range of preferences and financial requirements. Additionally, increased sophistication in management of the accounts has allowed for greater efficiency and precision in selection and definition of the terms, for example, usage restrictions and credit limits associated with the accounts.

Conventional transaction management systems and methods, however, do not allow for management of transactions based upon terms of other accounts or upon events occurring with respect to other accounts. Furthermore, conventional transaction management systems and methods do not provide an ability to maximize the benefits associated with a variety of accounts. Accordingly, a need exists for systems and methods for dynamically and automatically managing transactions based upon terms and/or events of a plurality of accounts to maximize benefit to the individual.

SUMMARY

An aspect of the present application provides for a method for managing transactions associated with accounts of an individual, comprising receiving information associated with the individual, receiving information associated with a first account of the individual, receiving information associated with a second account of the individual, processing the received information associated with the individual, the received information associated with the account, and the received information associated with the second account, and automatically performing a transaction based upon a result of the processing.

A further aspect of the present application provides for a method for presenting account information of an account of an individual via a communication network, comprising randomly selecting at least one account information display position, the at least one position corresponding to a location within a display format when the display format is rendered on a display screen, generating a formatting document, the formatting document describing location of the account information within the display format in accordance with the at least one selected position, and transmitting the formatting document and the account information via the communication network.

A further aspect of the present application provides for a system for managing transactions associated with accounts of an individual, comprising a memory unit and a processing unit, wherein the processing unit receives information associated with the individual, receives information associated with a first account of the individual, receives information associated with a second account of the individual, processes the received information associated with the individual, the received information associated with the account, and the received information associated with the second account, and automatically performs a transaction based upon a result of the processing.

DETAILED DESCRIPTION

The exemplary embodiments of the present application relate to systems and methods for managing transactions. Account information, such as financial account information, may be received and/or extracted from a variety of account information sources. The information sources may include at least one of a plurality of entities, such as financial entities, and the account information may be associated with a plurality of accounts. The received and/or extracted account information may be processed in conjunction with received and/or extracted identification information associated with the individual, and results of the processing may be analyzed to determine if they satisfy trigger conditions. The trigger conditions may include terms of other accounts, events occurring within or in association with other accounts, and the like. When the trigger conditions are satisfied, transactions may be automatically performed. Alternatively, the satisfaction of the conditions may be associated with generation of a query prompting the individual to perform one or more transactions, and to specify quantities and other parameters for the performed transactions. The transactions may include a plurality of entities, and the plurality of entities may be independent or affiliated. The transactions may be managed to utilize a favorable set of account conditions, to minimize costs and/or fees associated with negative account conditions, to schedule optimal periodic payment funding, and to maximize overall benefit to the individual with respect to a plurality of accounts.

Figure 1:
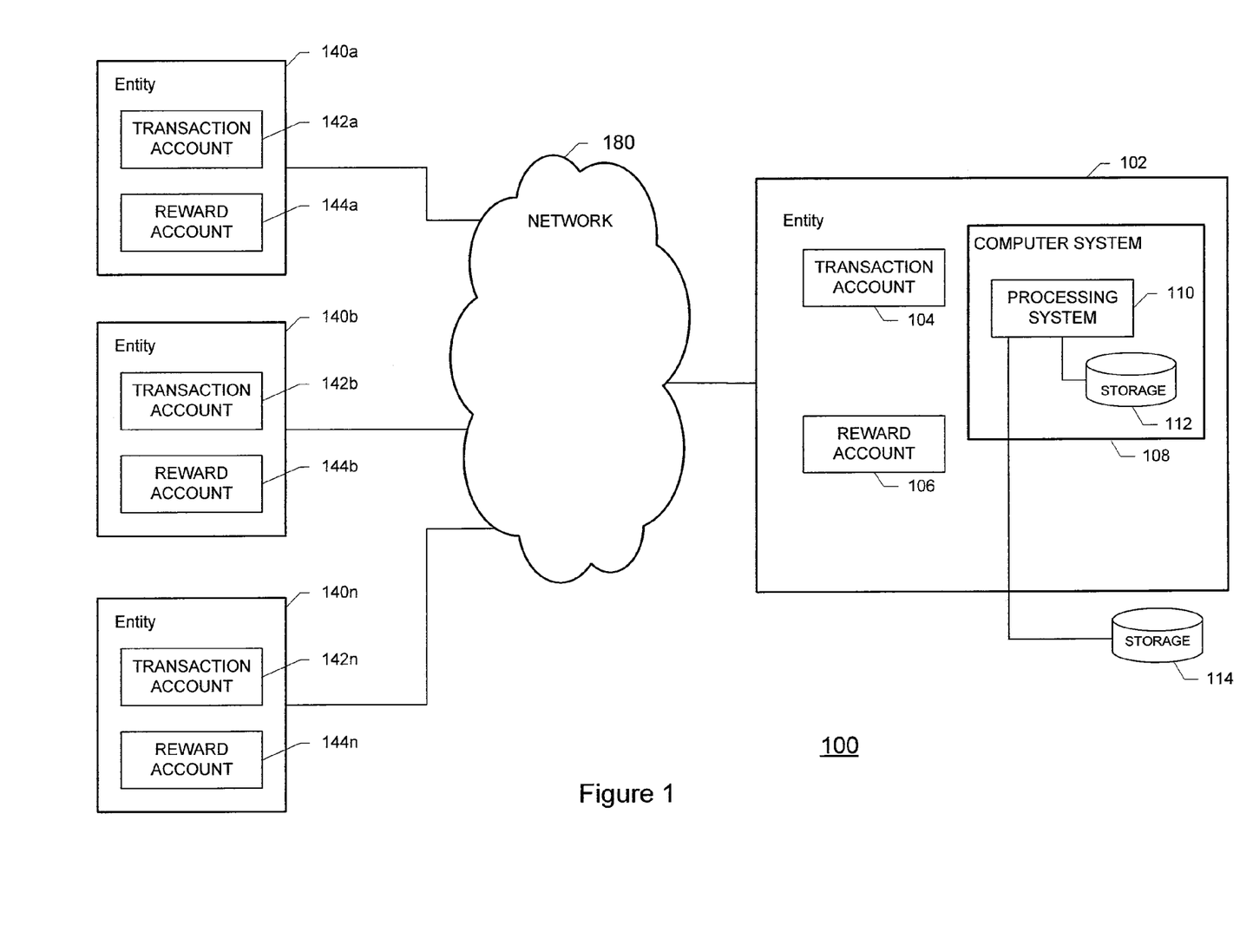
FIG. 1 shows an exemplary system for managing transactions according to the exemplary embodiments of the present application.

In an exemplary embodiment, the monitoring, extraction, and management of the account information, the conditions, the triggers, the transactions, and the like may be performed in association with an account management system 100 as shown in FIG. 1. The account management system 100 may include an entity 102 and at least one transaction account 104 managed by the entity 102. The entity 102 may include, for instance, a financial entity, and the financial entity may provide various services associated with establishment, maintenance, and usage of accounts. The entity 102 may provide services to individuals through the transaction account 104, and the transaction account 104 may be associated with balances of cash and/or credit.

In an exemplary embodiment, the transaction account 104 may include a deposit account, and the deposit account may include a cash deposit account used to maintain a balance of cash deposited by the individual. The cash deposit account may include a checking account or a savings account. Alternatively, the deposit account may include a money market account, a securities account, and the like. Withdrawal transactions may be performed to withdraw the deposited cash, and the withdrawal transactions may include usage of a debit transaction card, a check card, and the like, for example, at a location of a merchant in association with purchase of goods and/or services.

In an alternative exemplary embodiment, the transaction account may include a credit transaction account, and the credit transaction account may be associated with a secured or unsecured line of credit accessible via the account. Alternatively, the credit associated with the account may include a home equity line of credit ("HELOC") and/or another line of credit secured by real property, personal property, securities, cash, and the like.

The transaction account 104 may be associated with an individual, the individual typically being an identified principal holder of the account. In alternative embodiments, one or several holders may be associated with a single transaction account 104, including individuals, corporate organizations, charitable organizations, subchapter S corporations, partnerships, small businesses, and other suitable enterprises.

To facilitate use of the transaction account 104 in performance of transactions, the entity 102 may additionally manage a reward account 106 that is linked or associated with the transaction account 104. The reward account 106 may be used to maintain a balance of a reward, and the reward may include reward units, for example in the form of reward points or reward miles. Reward units may be credited to and accrued by the individual, for example, when the transaction account 104 is used at any number of merchants providing a plurality of goods and/or services. Reward units may be associated with a predetermined quantity or value of an incentive, promotion, benefit, or the like associated with the use of the transaction account 104. Reward units may be redeemable for discounts from a price of goods and/or services. Additionally, reward units may be redeemable for direct exchanges for goods and/or services. For example, reward unit types may be linked to different types of merchants, industries, service providers, the like, and the reward units may be redeemable in different forms including lodging units, airline miles, merchandise units, service units, gift certificates, cash, and the like.

One or more transaction cards for performing transactions may be linked with transaction account 104 and/or reward account 106. The one or more transaction cards may be used to perform transactions, and the performance of the transactions may include reading information encoded and/or stored on the transaction cards. The transaction card may include, for instance, a credit card, a debit card, a check card, a smart card, and the like. The storage of the information on the transaction cards may be facilitated by a mechanism such as a magnetic strip positioned on the transaction card or via a processing unit incorporated into the transaction card. Accordingly, the individual may use the transaction card to perform transactions, for example purchase transactions, through a merchant using funds and/or credit held in the transaction account 104 and/or reward units held in the reward account 106.

The entity 102 may include, for example, a financial entity such as a bank, a brokerage, a mortgage company, a credit union, and a transaction card issuer, such as a credit card issuer. Additionally, in an exemplary embodiment, the entity 102 may be associated with management and/or facilitation of payments for transactions performed by the individual. As will be appreciated by one skilled in the art, the term "account" may include any arrangement providing for dealings or services, and may include services associated with transactions involving items, services, persons, etc.

An exemplary account management system 100 of the present application may include software programs and/or routines stored in and executed, for example, by a computer system 108 associated with the entity 102, and each software program and/or routine may be capable of performing communication with other computer systems in conjunction with conventional computer communication hardware and software. The other computer systems may be associated with entity 102 or with one or more entities independent of entity 102. Communication between the computer systems may be performed via a public communication network, for example the Internet, or may be performed via a private communication network separate from and independent of a public communication network. Additionally, the terms "computer system" and "network" as used herein may include a variety of combinations of fixed and/or portable computer hardware, software, peripherals, and storage devices.

The computer system 108 may include a plurality of individual components that may be networked or otherwise linked to perform collaboratively, or may include a single, stand-alone component having physically-integrated components. The computer system 108 associated with the entity 102 may further include a processing system 110, at least one internal storage device 112, and at least one external storage device 114. The storage devices may include dedicated storage servers, storage-area networks, RAID configurations, and the like. The external storage device 114 may include remote storage managed by an entity independent of entity 102.

As will be understood by one skilled in the art, the computer system 108 may also include computer system components including a random-access memory, one or more hard drive devices, and peripherals such as keyboards, mice, and monitors for enabling input and output of information to and from the computer system 108. Software routines and/or programs may be embedded and/or stored in the internal storage device 112 or the external storage device 114 and may be run by the processing system 110. Additionally, the computer system 108 may be capable of network communication, and the network may include wired or wireless communication lines and associated hardware devices used in transmitting, receiving, and routing data, such as routers, switches, hubs, interfaces, and the like. The hardware and software components of the computer system 108 of the present application may include and may be included within fixed and portable devices including desktop, laptop, server, personal digital assistant, smart phone, clock, television, radio, and audio and video recording devices.

The transaction management system 100 may additionally include other entities 140a-140n. The other entities 140a-140n may include financial entities, and the structure and elements of each of the other entities 140a-140n may be substantially similar to the structure and elements of entity 102.

The other entities 140a-140n may be separate and independent of entity 102, or may be affiliated and/or under common control of entity 102. For instance, other entities 140a-140n may include subsidiaries and/or affiliates of entity 102, or may include competitors of entity 102. Any number of other entities 140a-140n may be included. Each of the entity 102 and the other entities 140a-140n may be connected to and may communicate via communication network 180. Communication network 180 may include a private, dedicated data communication network, or may include and/or incorporate a public communication network such as the Internet.

Alternatively, the other entities 140a-140n may include entities different than entity 102. For instance, the other entities 140a-140n may include service providers, retail establishments, vendors, public utilities, entertainment content providers, academic institutions, or any other suitable entity that may establish accounts and account funding relationships with individuals. The other entities 140a-140n may include a vendor having a physical store carrying an inventory of products for sale to individuals, or may include a "virtual" store in the form of a web page presented to and usable by individuals via a communication network such as the Internet. The other entities 140a-140n may utilize a transaction system operable for performing transactions, for example purchases, sales, refunds, rebates, and the like involving products and/or services offered by the merchant. In an exemplary embodiment, the transaction system may include a point of sale ("POS") terminal operable for reading the transaction card. Alternatively, each transaction system may include an automated teller machine ("ATM"), a cash register, a transaction card reading device, a magnetic scanning device, an optical scanning device, and the like, and may include a display device and a printing device for presenting information to the individual performing the transaction.

The transaction account 104 and/or reward account 106 may be associated with at least one term. The at least one term may include, for instance, a credit limit, a fee, a charge, a minimum or maximum balance, a transaction quantity limit, an interest rate, a transaction frequency limit, and the like. The credit limit may be operable to limit an amount of credit that the individual may utilize and/or an amount of credit that the entity may extend to the individual via the account at a given time or within a predetermined period of time.

The fee and/or the charge may relate to, for instance, quantities levied against the transaction account 104 and/or reward account 106 when a balance of the respective account falls below a predetermined level. The fee and/or the charge may alternatively be associated with a quantity levied for the performance of a transaction, for instance a cash withdrawal and/or debit transaction performed using an ATM or POS terminal. The fee and/or the charge may also relate to a quantity charged in association with a cash advance transaction, a fund transfer transaction, a balance inquiry transaction, an account opening transaction, an account closing transaction, an inquiry communicated to a customer service department, a refund transaction, a triggering of an overdraft condition, a transaction utilizing a certified or bank check, and the like.

The at least one term associated with the transaction account 104 and/or the reward account 106 may be determined by the entity 102, and may be defined based upon information associated with characteristics of the individual. The individual information may include, for instance, a credit score of the individual, income information of the individual, transaction and/or spending history information of the individual, payment history information of the individual, occupation of the individual, education of the individual, demographic information of the individual, or any other suitable individual characteristic information.

The at least one term may be determined initially at a time of establishment of the transaction account 104 and/or the reward account 106, and may thereafter be fixed or adjustable by the entity and/or by the individual. Adjustment of the at least one term may be performed based upon, for example, periodic calculations performed using a transaction history of the individual, income information of the individual, payment history of the individual, credit score of the individual, and the like. In an exemplary embodiment, for instance, a credit limit term may be adjusted upwards based upon a history of timely repayment of credit utilized by the individual. Likewise, the credit limit may be adjusted downwards based upon a history of delinquent repayment of the utilized credit by the individual. Similarly, in alternative exemplary embodiments, a minimum account balance may be adjusted, or a quantity of a fee and/or charge may be adjusted in association with a history of performance of payment of the individual. Alternatively, the at least one term may be adjustable by instruction communicated by the individual.

At least one account term may additionally be associated with one or more of the other transaction accounts 142a-142n and/or the other reward accounts 144a-144n. The at least one account term associated with the other accounts managed by other entities 140a-140n may be substantially similar in definition, scope, and operation as the terms associated with the transaction account 104 and/or the reward account 106, as described above. As will be understood by one skilled in the art, however, each of the other accounts managed by other entities 140a-140n may also differ with respect to the quantity and/or values of terms as compared to the transaction account 104 and/or the reward account 106.

Therefore, the individual may hold a plurality of transaction and/or reward accounts, and any or all of the accounts held may differ with respect to the terms associated therewith. The systems and methods of the present application may provide for management of transactions in association with maximization of benefit of the respective terms to the individual. Information relating to the terms of the various accounts may be extracted and processed, and the results of the processing may be used to select transactions, funding sources, and/or fund routing that may be performed to maximize benefit to the individual. The maximized benefit may relate to one or to more than one of the plural accounts. The transactions may be associated with triggers that may be activated upon the detection of one or more predetermined conditions and/or combinations of conditions.

Figure 2:
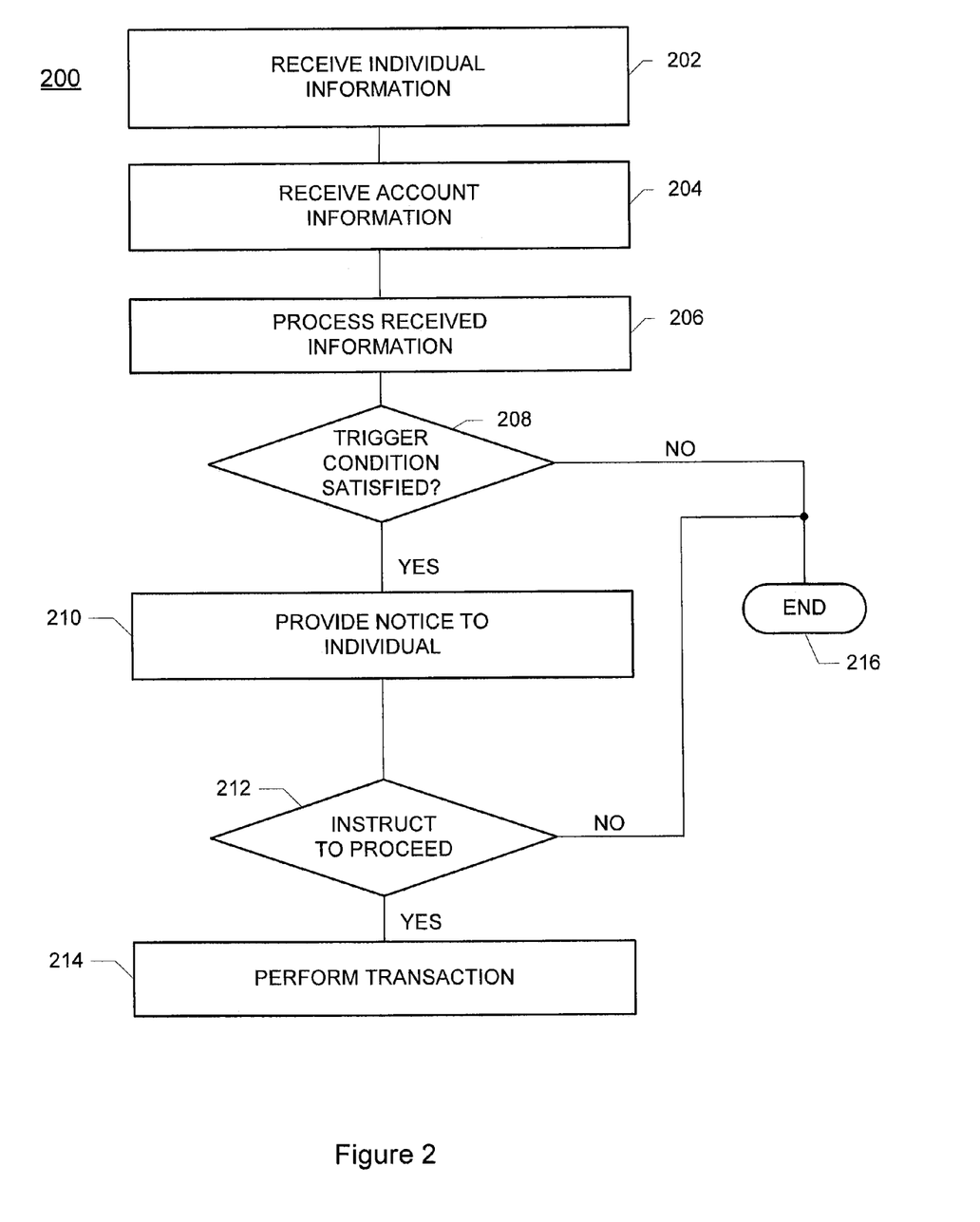
FIG. 2 is a flow diagram illustrating an exemplary method for managing transactions according to the exemplary embodiments of the present application.

For example, referring to the method 200 as illustrated in FIG. 2, in an exemplary embodiment information associated with the individual may be retrieved and/or received at step 202. In an exemplary embodiment, the information associated with the individual may include an individual name, an individual address, an individual taxpayer identification number, individual financial asset information, individual financial history information, individual employment information, and the like. Additional individual information may also be collected, for instance, information such as demographic information of the individual, a history of purchases by the individual of a type of product or service, a history of purchases by the individual at a particular merchant or branch retail locations of one or more merchants, a history of purchases by the individual in a geographical region, and the like. The demographic identification information of the individual may include information related to the individual's age, sex, family status, and the like. The collected information may be stored, for example, in one or more databases located in internal storage device 112 or external storage device 114.

The individual information may be retrieved from and/or received via communication from a storage device, for instance, via internal storage device 112 or external storage device 114. The individual information may correspond to information initially stored at a time of account establishment, or stored after account establishment, for example by collection via survey, via communication to a telephone customer service agent, via entry by the individual into an online information collection application, and the like. The individual may modify the individual information after collection, for example, to adjust the information for changes in identification and/or address information, and to modify the list of accounts which are utilized in the account management methods of the present application.

Information associated with one or more accounts may be retrieved and/or received at step 204. The account information may include information associated with the terms of the one or more accounts. The one or more accounts may include a savings account, a checking account, a credit account, a debit account, a home equity line of credit account, a brokerage account, and the like. The account information may include, for example, account identification information such as account name or account number, financial institution identification information, account balance information, account credit limit information, account interest rate information, account minimum and/or maximum balance information, account fee information, account transaction frequency limitation information, account transaction quantity limitation information, and the like. The account information may relate to a single account of the individual, or may relate to a plurality of accounts of the individual, managed by the entity 102. Alternatively, the information may include identification information associated with transaction and/or reward accounts managed by an entity separate from and independent of the entity 102. The collected information may be stored, for example, in one or more databases located in internal storage device 112 or external storage device 114.

The account information associated with one or more accounts managed by entity 102, for instance, transaction account 104 or reward account 106, may be retrieved or retrieved from internal storage device 112 or external storage device 114. The account information receipt and/or retrieval with respect to other accounts, for instance accounts managed by other entities 140a-140n, may be performed in various ways.

In an exemplary embodiment, for instance, the account information for the other accounts may be received by direct communication performed via communication network 180. The direct communication may be performed in accordance with instructions of the individual, instructing one or more of the other entities 140a-140n to transmit the account information, for instance, at a predetermined frequency such as daily, monthly, quarterly, or the like. Alternatively, the other entities 140a-140n may facilitate querying and retrieval of the account information by the entity 102, for instance through a software application running on computer system 108 and communicating with the computer systems of the other entities 140a-140n through communication network 180.

In an alternative exemplary embodiment, the other entities 140a-140n may provide the account information via an Internet web server or similar software application, and the account information for the other accounts may therefore be retrieved by a "screen-scraping" or analogous procedure. The "screen-scraping" retrieval of the account information may be performed with or without specific facilitation by the other entities 140a-140n. As will be understood by one skilled in the art, screen-scraping may be utilized when information is accessible and/or transmitted via a network and scannable by a software application capable of parsing and/or interpreting the transmitted information. For instance, one or more of the other entities 140a-140n may utilize computer systems that allow individuals to retrieve account information via a public communication network, such as the Internet. The account information may be presented, for example, in the form of information formatted in hyper-text markup language ("HTML"), or formatted in another web browser-readable format. The individual may then, for instance, access account information utilizing a web browser. By utilizing a screen-scraping procedure, retrieval of the account information may be performed using a screen-scraping software application, whereby the screen-scraping application retrieves the HTML or browser-formatted information, parses the received information, and extracts the pertinent account or other information retrieved. The extracted information may then be displayed on a screen for viewing by the individual, or may be further processed and/or formatted for use by another software application. Use of screen-scraping software applications is well-known in the art, and therefore will not be described more extensively herein.

In an alternative exemplary embodiment, the screen-scraping application may include an optical-character recognition ("OCR") procedure. The OCR procedure may be performed by a software application, and may include the retrieval of an image-based representation of account information, scanning and/or parsing of the data of the image-based account information representation, and extraction of the account information from the image-based representation. The OCR procedure may include, for example, analysis of image element information of the image to extract account information from the image-based representation.

Alternatively, the account information may be retrieved, for instance, in a text file format, spreadsheet file format, or via an information file encoded in any other suitable file format. Additionally, the other account information may be received and/or retrieved by other mechanisms, including by manual entry by the individual or via a customer service representative.

The retrieval of the account information may be performed by the entity 102. Alternatively, the retrieval of the account information may be performed by another entity, and the retrieved account information may then be transmitted to the entity 102.

In an exemplary embodiment, the account information may be retrieved by an information retreival software application running on another computer system, for example, a computer system of the individual. The information retrieval software application may be operable to retrieve the account information from one or more of the other entities 140a-140n, and may thereafter transmit the received account information to the entity 102. The information retrieval software application may, for instance, automatically retrieve the account information upon starting and/or rebooting of the individual's computer, and may continuously retrieve the account information and/or update the received account information at a predetermined frequency, such as hourly, daily, weekly, quarterly, and the like. Alternatively, the account information retrieval software application may be activated by the individual at a requested time by instruction performed by the individual.

In alternative exemplary embodiment, the systems and methods of the present application may include procedures for preventing extraction of the information of one or more of the accounts of the individual, such as transaction account 104 and/or reward account 106. The information extraction prevention procedures may include, for example, dynamic presentation of account information, incorporation of false and/or inconsistent data into a presentation of account information, and employment of non-HTML-based presentation procedures. For instance, presentation of account information in a web browser-readable format may be performed in accordance with a random geometrical placement of the account information within a web page, whereby the randomly-structured web page may allow an individual to visually interpret the presented information, but which may prevent an automated screen-scraping software application from extracting the account information based upon its location upon the displayed web page. The random geometrical placement may be performed, for example, by randomly selecting at least one account information position within a display format defined by a HTML-formatted document, and generating a web page HTML document including the randomly selected positioning information. The placement may be defined as an absolute distance from an origin point, such as a number of pixels, inches, millimeters, or any other suitable display format distance unit. Alternatively, the placement of the account information may be defined relative to a position of other HTML element positions within the display format. HTML tags and/or metatags associated with the presentation of the account information and with composition of a web page containing the account information may be modified and/or may include additional information, whereby the modification and/or additional information may prevent and/or confuse automatic extraction of the account information by a screen-scraping software application. As will be understood by one skilled in the art, similar procedures may be included in data presentations utilizing DHTML, XML, Java, and other data presentation formats.

In an alternative exemplary embodiment, false and/or inconsistent information may be included in a presentation of account information, for instance in a web browser-readable format. The false and/or inconsistent data may include invisible text information, text presented in a background color, text information in minute font size, image information, metatag information, and the like, whereby the false and/or inconsistent data may not be visible and/or may not present a difficulty to an individual viewer, but may corrupt retrieval of the account information by an automated screen-scraping software application. Alternatively, non-HTML technologies may be utilized to present the account information, for example, through the use of images, applets, ActiveX controls, Flash content, and the like, such that the presented account information may be viewable by an individual viewer, but may not be retrievable and/or extractable by an automated screen-scraping software application.

The information received at steps 202 and 204 may be processed at step 206. In an exemplary embodiment, the processing may be performed using software programs and/or routines run by the processing system 110, and may include searching one or more databases stored in internal storage device 112 or external storage device 114 using the received information. Additionally, information retrieved from external databases and sources of information stored in one or more external storage devices 114 may be utilized in the processing. For example, databases storing historical financial behavior information, such as credit score information, may be searched utilizing the collected individual identification information.

The processing may include comparison of terms of the one or more accounts, for example, of the transaction account 104, the reward account 106, one or more of the other transaction accounts 142a-142n, and one or more of the other reward accounts 144a-144n. Additionally, the processing may include processing of balances, transactions history and/or transaction quantity, and the like associated with any of the above-mentioned accounts. In various exemplary embodiments, the processing may include calculation of values, and comparison of the calculated values may be analyzed to determine if they satisfy one or more predetermined trigger conditions associated with the accounts, at step 208. The trigger conditions may be related to relative values and/or levels of the account terms, balances, and/or other account characteristics.

Satisfaction of the one or more predetermined trigger conditions may be associated with performance of one or more associated transactions at step 214. When the one or more predetermined trigger conditions are not satisfied, the process may end at step 214. In an alternative exemplary embodiment, when the one or more predetermined trigger conditions are not satisfied, the process may return to step 202, and the receipt of information, processing, and comparison may be repeated, and the repetition may be repeated continuously in a loop. This repetition may be performed at a predetermined frequency, for instance hourly, daily, weekly, quarterly, and the like.

In an exemplary embodiment, for instance, one or more of the transaction account 104, the reward account 106, the other transaction accounts 142a-142n, and/or the other reward accounts 144a-144n may be associated with account terms, including fees, charges, interest rates, minimum balances, transaction frequency and/or quantity limits, credit limits, and the like. The processing of step 206 may include tabulation and comparison of the terms of each of the respective accounts. The comparison may indicate, for instance, which of the respective accounts are associated with terms being relatively more beneficial to the individual holding the accounts. Results of the processing of step 206 may be compared to one or more predetermined trigger conditions to determine if a transaction should be performed, for instance a transfer of funds from an account associated with relatively inferior terms to an account having relatively beneficial terms.

The transaction may be performed between one or more account managed by the entity 102, for example transaction account 104 or reward account 106, and one or more of the other transaction accounts 142a-142n, and/or the other reward accounts 144a-144n. Alternatively, the transaction may exclude the accounts managed by the entity 102, and may be performed between the other accounts such as one or more of the other transaction accounts 142a-142n, and/or the other reward accounts 144a-144n.

For instance, the processing of step 206 may compare interest rate terms of each of the accounts, the interest rate term describing a rate of interest paid to the individual on funds deposited in the respective account. The results of the processing of step 206 may indicate that one of the accounts is associated with an interest rate term that is higher than one or more of the other accounts, and an interest rate term differential between the respective accounts may be determined. The determined interest rate differential may then be compared to the predetermined trigger conditions at step 208. When the interest rate differential is large enough to satisfy the interest rate trigger condition, a transaction at step 214 may be triggered. The triggered transaction may include, for instance, a transfer of funds from an account having a relatively lower interest rate term (i.e., a "relatively inferior account") to an account having a relatively higher interest rate term (i.e., a "relatively superior account"). As will be understood by one skilled in the art, the terms "relatively inferior account" and "relatively superior account" as used herein relate to comparison of values of terms of the respective accounts with respect to maximization of benefit to the individual which may vary with changing account terms and balances, and do not refer to an overall quality or desirability of each of the respective accounts in general.

The quantity of the funds transferred in the triggered transaction may be adjusted by the individual, and may, for instance, be equal to a fixed quantity of funds. The quantity of funds transferred may alternatively be determined automatically based upon the processing of step 206 and may be determined such that a balance of the relatively inferior account is not lowered below a value corresponding to a minimum balance term. The minimum balance term of the relatively inferior account of the present exemplary embodiment may be reprocessed at each iteration of the processing of step 206, and the transferred amounts may be adjusted in accordance with any modification made to the minimum balance term of the relatively inferior account. The transfer of the transaction may be performed, for instance, using an automated clearinghouse ("ACH") and/or personal identification number ("PIN") debit, and may be automatic. Alternatively, satisfaction of one or more of the trigger conditions may cause a communication to be sent to the individual advising of the results of the processing of step 206 and prompting the individual to authorize and/or confirm the performance of the transaction of step 214, as described in association with step 210 below.

Similar steps may be performed in association with other account terms. For instance, in an alternative exemplary embodiment, account fee terms of the various plural accounts may be analyzed, and one or more transfer transactions may be performed upon satisfaction of one or more trigger conditions to transfer funds from accounts associated with relatively higher fees to accounts associated with relatively lower fees, to maximize a benefit to the individual.

The trigger conditions may be fixed or adjustable, and may be related to the type and quality of the associated account term. For instance, a minimum balance account term may be associated with a trigger condition related to a balance value of the associated account, whereby an account balance falling below the balance value may satisfy the trigger condition. Account terms associated with dates, such as terms related to periodic or recurring payments, may be associated with trigger conditions that include predetermined dates or frequencies. Account terms including interest rates and/or values derived from interest rates may be associated with trigger conditions that include or are derived from an interest rate, a prime rate, a LIBOR rate, a federal funds rate, a treasury bond coupon rate, and the like.

The processing of step 206 may relate to negative account terms. In an exemplary embodiment, for instance, one or more of the transaction account 104, the reward account 106, the other transaction accounts 142a-142n, and/or the other reward accounts 144a-144n may be associated with overdraft protection fees, fund transfer charges, and the like. The processing of step 206 may include, for example, analysis of each transaction performed using each of the respective accounts, and a determination of whether any transaction, such as a withdrawal, may cause a balance of one or more of the accounts to fall below a threshold level associated with an overdraft term. When it is determined that a transaction may cause a balance to fall below an overdraft threshold level, a trigger condition may be satisfied, and a transaction may thereby be performed at step 214, for instance such as a transfer of funds into an account being in an overdraft status. The overdraft deposit transaction may include a transfer of funds from an account having a relative surplus of funds, or a deposit into the account having the overdraft status.

Alternatively, the trigger condition and corresponding transaction may relate to a pending account overdraft status, whereby one or more transactions have been performed, for instance by the individual, but have not yet been fully settled and/or funded. For instance, a transaction may be performed in association with one or more of the transaction account 104, the reward account 106, the other transaction accounts 142a-142n, and/or the other reward accounts 144a-144n, whereby performance of the transaction and funding and/or settlement of the transaction are separated by a predetermined period of time. In an exemplary embodiment, for example, transactions performed during a day are in a "pending" status until a conclusion of that day, whereby they are settled and/or funded by the respective account and corresponding funds are transferred. Therefore, the trigger condition and corresponding transaction may relate to the pending transaction, and may include transferal of funds to avoid an overdraft status when the processing indicates that the pending transaction may cause the respective account to be placed into an overdraft status upon settlement and/or funding.

The processing of step 206 may also include analysis of negative account terms that are associated with inactivity of the respective account and/or of the individual. In an exemplary embodiment, for instance, the account terms associated with one or more of the transaction account 104, the reward account 106, the other transaction accounts 142a-142n, and/or the other reward accounts 144a-144n may include a late payment fee, a finance charge, a periodic payment, and the like, whereby a charge may be levied against the account or the individual when a payment or fund transfer is not performed within a predetermined time period of time or by a predetermined due date. The processing of step 206 may include, for example, analysis of each transaction performed using each of the respective accounts, and a determination of whether a predetermined period of time or a due date may be made, in combination with a determination of whether any outstanding payments or fund transfers within those periods are unperformed. Upon determination that a period of time exists, and that an payment due within that period has not been performed, a trigger condition may be satisfied. Satisfaction of the trigger condition may correspond to performance of a transaction at step 214, for example, a payment transaction to satisfy the determined unperformed payment.

Alternatively, the required payment may correspond to a remittance of a payment associated with credit extended to the individual, for example through use of a credit card or line of credit, such that nonperformance of the payment may result in the accumulation of a credit balance. Therefore the transaction at step 214 may correspond to remittance of the payment corresponding to the extended credit, to prevent accumulation of a credit balance and the incurring of associated interest charges.

The processing of step 206 may also include analysis of recurring or repetitive payments or payments that are made through an online mechanism. In an exemplary embodiment, for example, the individual may identify and/or communicate a desire to automatically fund recurring or periodic payments. The recurring or periodic payments may relate to, for instance, monthly bills for services, subscriptions, phone bills, cable bills, credit card balance payments, and the like. The individual may designate one or more of the transaction account 104, the reward account 106, the other transaction accounts 142a-142n, and/or the other reward accounts 144a-144n as a funding source for one or more of these recurring or periodic payments.

The processing of step 206 may include analysis of the scheduled payments, the assignments of payments to the various funding source accounts, balances of each of the respective accounts, and the like. The analysis may identify errors and/or situations whereby the periodic payment may not be funded, or whereby the funding of the periodic payment may generate additional fees for the individual. For instance, a funding source account may not contain sufficient funds to completely fund an assigned periodic or recurring payment, or a funding of a periodic or recurring payment may result in an overdraft condition and/or a reduction in balance of the funding source account to a level below a threshold level. Such an overdraft and/or over-reduction in balance may be associated with a trigger condition, and satisfaction of the trigger condition may be related to performance of a transaction at step 214, for instance, a fund transfer transaction depositing additional funds from an account associated with a surplus to the assigned periodic payment funding account. Alternatively, the transaction may be associated with a reassignment of the funding source account for the periodic payment, such that the periodic payment funding source account contains sufficient funds to avoid an overdraft and/or underbalanced status.

The transaction of step 214 may be performed automatically upon satisfaction of one or more of the trigger conditions as described above. Alternatively, in an exemplary embodiment, a notice to the individual informing of the satisfaction of the trigger condition and the corresponding transaction may be generated and provided to the individual at step 210. For instance, the notice may describe an insufficiency of funds and/or minimum balance term of the periodic payment funding account, and thereafter the individual may be prompted to provide instructions to proceed and/or to perform an action at step 212. When the individual instructs to proceed, the process may continue to step 214, where the transaction may be performed. When the individual instructs not to proceed, the process may end at step 216.

In an exemplary embodiment, the notice of step 210 may additionally include a query prompting the individual to authorize performance of the transaction and/or to designate a quantity associated with the transaction at step 212. For instance, the notice of step 210 may indicate that a relatively favorable interest rate term may be utilized through transferal of funds from one of the respective accounts to another account, provide some or all of the pertinent account information for examination, and query the individual for instruction to proceed and to input a quantity of funds to be transferred at step 212. Alternatively, the notice may prompt the individual to identify one or more of the respective accounts as a funding source or a funding recipient. The notice may be provided to the individual through postal mail, electronic mail, telephone communication, short message service ("SMS") communication, or by any other suitable communication channel.

In an alternative exemplary embodiment, the notice of step 210 may include a solicitation and/or recommendation for an alternative account vehicle and/or product based upon a result of the processing. For instance, the notice may describe a preferable account vehicle and/or financial product for use by the individual, based for example on account terms corresponding to accounts of the individual as described by the retrieved account information. The recommended alternative vehicle may include a relatively superior interest rate, fee, balance restriction, and the like. The recommended vehicle may be similar to the accounts utilized by the individual, or may relate to a different class and/or type of account vehicle. For instance, a certificate of deposit associated with a relatively superior interest rate may be recommended to an individual having a balance of funds maintained in a deposit account having a relatively inferior interest rate. The recommendation may be combined with the requested instructions of the prompt associated with the transaction, such that the individual may be given a choice between performing the transaction associated with satisfaction of the trigger condition or transferring funds to the alternative vehicle, or both.

A fee and/or charge may be imposed upon the individual or upon one or more of the accounts. The fee and/or charge may be assessed periodically, such as monthly, or quarterly, or may be assessed per transaction, upon a value of each transaction, and the like.

As will be understood by one skilled in the art, the present application is not limited to the precise exemplary embodiments described herein and that various changes and modifications may be effected without departing from the spirit or scope of the application. For example, elements and/or features of different illustrative embodiments may be combined with each other, substituted for each other, and/or expanded upon within the scope of the present disclosure and the appended claims. In addition, improvements and modifications which become apparent to persons of ordinary skill in the art after reading the present disclosure, the drawings, and the appended claims are deemed within the spirit and scope of the present application.

What is claimed is:

1. A method for managing transactions associated with accounts of an individual, comprising:
   receiving information associated with the individual;
   receiving information associated with a first account of the individual;
   receiving information associated with a second account of the individual;
   processing the received information associated with the individual, the received information associated with the first account, and the received information associated with the second account; and
   automatically performing a transaction based upon a result of the processing, wherein
   the processing is based upon comparisons of one of terms and events of the first and second accounts to maximize a benefit to the individual.

2. The method of claim 1, wherein
   the information associated with the individual includes at least one of individual identification information, individual address information, individual taxpayer identification number information, individual financial asset information, individual financial history information, individual employment information, individual demographic information, or individual transaction history information.

3. The method of claim 1, wherein
   the first account includes at least one of a savings account, a checking account, a credit account, a debit account, a home equity line of credit account, or a brokerage account.

4. The method of claim 1, wherein
   the second account includes at least one of a savings account, a checking account, a credit account, a debit account, a home equity line of credit account, or a brokerage account.

5. The method of claim 1, wherein
   the information associated with the first account and the information associated with the second account include at least one of account identification information, account name information, account number information, financial institution identification information, account balance information, account credit limit information, account interest rate information, account minimum balance information, account maximum balance information, account fee information, account transaction frequency limitation information, or account transaction quantity limitation information.

6. The method of claim 1, wherein
the first account is managed by a first entity; and
the second account is managed by a second entity.

7. The method of claim 1, wherein
the first account and the second account are operable for maintaining balances of funds;
the processing includes comparing a fee associated with the first account and a fee associated with the second account; and
the transaction includes transferring at least a portion of a balance of the first account to the second account when the fee associated with the second account is less than the fee associated with the first account.

8. The method of claim 1, wherein
the first account and the second account are operable for maintaining balances of funds;
the processing includes comparing an interest rate associated with the first account with an interest rate associated with the second account; and
the transaction includes transferring at least a portion of a balance of the first account to the second account when the interest rate associated with the second account is larger than the interest rate associated with the first account.

9. The method of claim 1, wherein
the first account and the second account are operable for maintaining balances of funds;
the processing includes subtracting a value of a quantity withdrawn from the first account in association with a withdrawal transaction from a balance of the first account; and
the transaction includes transferring at least a portion of a balance of the second account to the first account when the quantity withdrawn from the first account causes the first account to be overdrawn.

10. The method of claim 1, wherein
the first account and the second account are operable for maintaining balances of funds;
the processing includes subtracting a value of at least one recurring payment associated with the first account from a balance of the first account; and
the transaction includes transferring at least a portion of a balance of the second account to the first account when the value of the at least one recurring payment is larger than the balance of the first account.

11. The method of claim 1, wherein
the first account and the second account are operable for maintaining balances of funds;
the processing includes comparing a finance charge associated with the first account and a finance charge associated with the second account; and
the transaction includes transferring at least a portion of a balance of the first account to the second account when the finance charge associated with the second account is less than the finance charge associated with the first account.

12. The method of claim 1, wherein
at least one of the receiving of information associated with the first account or the receiving of information associated with the second account includes retrieving of the respective account information via a communication network utilizing a screen-scraping software application.

13. The method of claim 1, wherein
at least one of the receiving of information associated with the first account or the receiving of information associated with the second account includes:
receiving image data including a graphical representation of the respective account information, and
processing the received image data utilizing an optical character recognition software application.

14. The method of claim 1, further comprising:
generating a notice based upon a result of the processing; and
providing the notice to the individual.

15. The method of claim 14, wherein the notice includes a query asking the individual to provide at least one of an authorization for the transaction, a quantity associated with the transaction, or account identification information associated with at least one of the first account or the second account.

16. The method of claim 14, wherein
the notice includes a query asking the individual to utilize an alternate account vehicle.

17. A system for managing transactions associated with accounts of an individual, comprising:
a memory unit; and
a processing unit, wherein
the processing unit:
receives information associated with the individual;
receives information associated with a first account of the individual;
receives information associated with a second account of the individual;
processes the received information associated with the individual, the received information associated with the first account, and the received information associated with the second account; and
automatically performs a transaction based upon a result of the processing, wherein
the processing is based upon comparisons of one of terms and events of the first and second accounts to maximize a benefit to the individual.

* * * * *